US009521640B2

(12) United States Patent
Azuma

(10) Patent No.: US 9,521,640 B2
(45) Date of Patent: Dec. 13, 2016

(54) MOBILE TERMINAL, VEHICULAR DEVICE, AND PORTABLE COMMUNICATION TERMINAL

(71) Applicant: DENSO CORPORATION, Kariya, Aichi-pref. (JP)

(72) Inventor: Ami Azuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 157 days.

(21) Appl. No.: 13/686,279

(22) Filed: Nov. 27, 2012

(65) Prior Publication Data
US 2013/0316707 A1 Nov. 28, 2013

(30) Foreign Application Priority Data

May 23, 2012 (JP) .................. 2012-117498

(51) Int. Cl.
H04M 1/00 (2006.01)
H04W 60/00 (2009.01)
H04M 1/60 (2006.01)

(52) U.S. Cl.
CPC .......... H04W 60/00 (2013.01); H04M 1/6083 (2013.01)

(58) Field of Classification Search
CPC .......... H04L 67/34; H04L 67/36; H04L 69/00; H04W 4/00; H04W 4/02; H04W 4/04; H04W 4/10; H04W 4/12
USPC ..... 455/412.1–414.4, 456.1–456.3, 457, 566
See application file for complete search history.

(56) References Cited

U.S. PATENT DOCUMENTS

| 6,393,443 | B1* | 5/2002 | Rubin | G06F 17/22 715/236 |
| 8,850,052 | B2* | 9/2014 | Rosenblatt et al. | 709/231 |
| 2005/0261822 | A1* | 11/2005 | Wako | G09B 29/007 701/438 |
| 2007/0027949 | A1* | 2/2007 | Park | G06F 17/30817 709/203 |
| 2007/0244631 | A1* | 10/2007 | Jung | G01C 21/20 701/533 |
| 2008/0059580 | A1* | 3/2008 | Kalinowski | G06Q 10/107 709/204 |
| 2010/0056223 | A1* | 3/2010 | Choi | G06F 1/1601 455/566 |
| 2010/0081385 | A1* | 4/2010 | Lin et al. | 455/41.3 |

(Continued)

FOREIGN PATENT DOCUMENTS

JP     A-2010-026104        2/2010
WO     2013-175707 A1      11/2013
WO     2013-175737 A1      11/2013

Primary Examiner — Dai A Phuong
(74) Attorney, Agent, or Firm — Posz Law Group, PLC

(57) ABSTRACT

A mobile terminal displays, in a common format, a first list for a first registered facility information, which is managed by a database in a memory unit of the mobile terminal itself, and a second list for a second registered facility information, which is managed by a database in an external server. An operation input unit of the mobile terminal receives an input of a switch operation for switching between the first and second list for displaying information on a display unit. A control unit of the mobile terminal controls the display unit by changing the display of the registered facility information on the display unit according to the input of the switch operation from the operation input unit. The control unit controls the display unit to have the registered facility information from different databases displayed in a common format.

10 Claims, 8 Drawing Sheets

(56) References Cited

U.S. PATENT DOCUMENTS

| | | | |
|---|---|---|---|
| 2012/0194547 A1* | 8/2012 | Johnson et al. | 345/632 |
| 2012/0214505 A1* | 8/2012 | Kaido | A63F 13/12 455/456.1 |
| 2012/0272231 A1* | 10/2012 | Kwon et al. | 717/173 |
| 2015/0350741 A1* | 12/2015 | Rajaraman | G06F 17/30817 725/41 |

* cited by examiner

MOBILE TERMINAL, VEHICULAR DEVICE, AND PORTABLE COMMUNICATION TERMINAL

CROSS REFERENCE TO RELATED APPLICATION

The present application is based on and claims the benefit of priority of Japanese Patent Application No. 2012-117498, filed on May 23, 2012, the disclosure of which is in herein by reference.

TECHNICAL FIELD

The present disclosure generally relates to a mobile terminal, a vehicular device, and a portable communication terminal, which are capable of using multiple social networking services.

BACKGROUND

Conventionally, devices and terminals are capable of operating in cooperation with a portable communication terminal, and one such terminal is disclosed in, for example, Japanese Patent Laid-Open No. 2010-26104, which displays an image that is received by using the portable communication terminal.

Further, in recent years, information from a server is not only delivered to the terminal, but is also sent from the terminal, i.e., from a user side. For instance, serial networking services (SNS) store on a server side, as registered facility information, information about facilities based on a user preference, and such registered facility information may be shared with other users (i.e., with a third person), or may be exclusively used by one user by using the portable communication terminal. The registered facility information may be designated as a "favorite" information or "bookmark" information that may be registered by the user.

In each of social networking services, information registration service is provided in various manners and different forms, for the purpose of differentiation from each other. Therefore, screen formats and/or operation procedures are different for each of the SNSs. Thus, a user is required to perform respectively different operation procedures for respective SNSs if the user is registered to multiple SNSs.

However, it may be uncomfortable and difficult for the user, in case of using a common function in different SNSs, to perform different operation procedures in each of the multiple SNSs. That is, the usability of each of the multiple SNSs is currently deteriorated due to nonunified (i.e., not common) operation procedures of the same/common function(s) in different SNSs.

SUMMARY

It is an object of the present disclosure to provide a mobile terminal, a vehicular device, and a portable communication terminal that have an improved usability when the user uses multiple information provision services.

The mobile terminal of the present disclosure has a memory unit that stores and manages register facility information for a user registered facility. The registered facility information managed by the memory unit may be referred to as a first registered facility information. A display unit of the mobile terminal displays, in a common format, a first list for the first registered facility information and a second list for a second registered facility information. The second registered facility information is registered facility information managed by a database in an external server.

An operation input unit of the mobile terminal receives an input regarding a switch operation for switching between the first list and the second list for displaying information on the display unit. A control unit of the mobile terminal controls the display unit by switching the display of the registered facility information on the display unit according to the input of the switch operation.

In other words, the mobile terminal uses a common format for displaying a list of the registered facility information that comes from different databases. Therefore, the usability of the information, as well as, the mobile terminal, the vehicular device, and the portable communication terminal are improved.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

An embodiment of the present disclosure is described with reference to the drawings.

Figure 1:
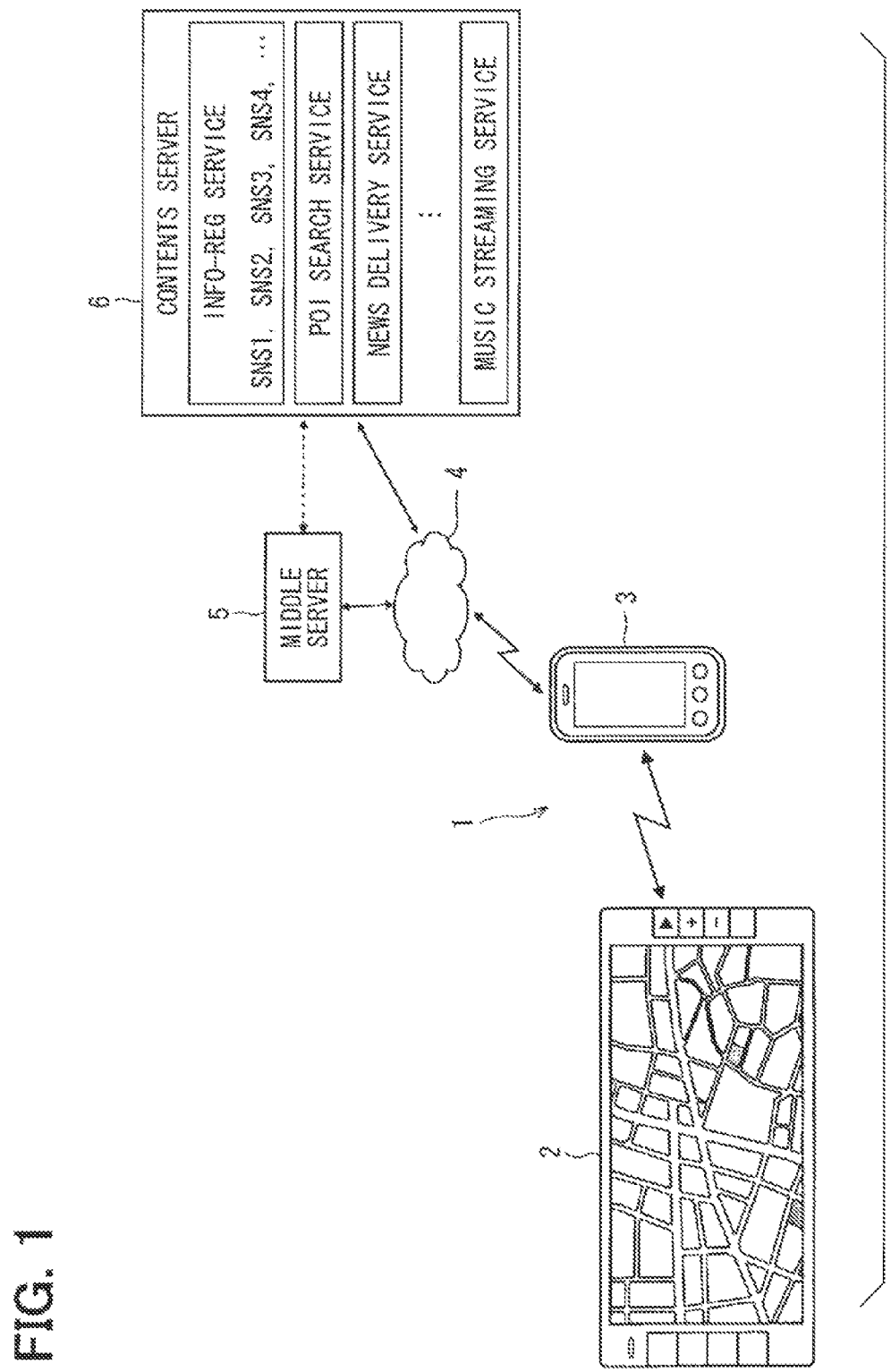
FIG. 1 is a block diagram of a vehicular system in which a mobile terminal is realized as an embodiment of the present disclosure.

As shown in FIG. 1, an information display system 1 includes a vehicular device 2 and a portable communication terminal 3, which together or separately may serve as a mobile terminal. The system 1 further includes a middle server 5 and a contents server 6 as servers in an external network 4. In the system 1, the mobile terminals (i.e., the vehicle communication device 2 and/or the portable communication terminal 3) and the servers 5, 6 are connected by the external network 4 for enabling communication therebetween.

In the present embodiment, the vehicular device 2 is disposed in a vehicle, and may be fixedly installed in a vehicle compartment or may be movably carried in the vehicle.

The information display system 1 uses various contents provided by the contents server 6. Available contents are, for example, a point of interest (POI) search service, a news distribution service, multiple social networking services SNS1 to SNS4, and a music streaming service. Further, the contents may be provided by only one provider, or may be provided from respectively different (i.e., multiple) providers.

In most cases the contents are provided in respectively different data formats that are set by respective providers. Therefore, in the information display system 1, the middle server 5 is set up between the mobile terminal and the contents server 6 for converting various data formats of provided contents from respective providers to a unified data format.

In the present embodiment, information from each of SNS1 to SNS4 is considered as conversion objects. Each of SNS1 to SNS4 manages a registered facility information about facilities that are registered either by a user or by a third person to respectively different databases. That is, facility information of favorite facilities is registered as "bookmarks" in different databases of SNS1 to SNS4. In other words, each of SNSs has its own database.

Figure 2:
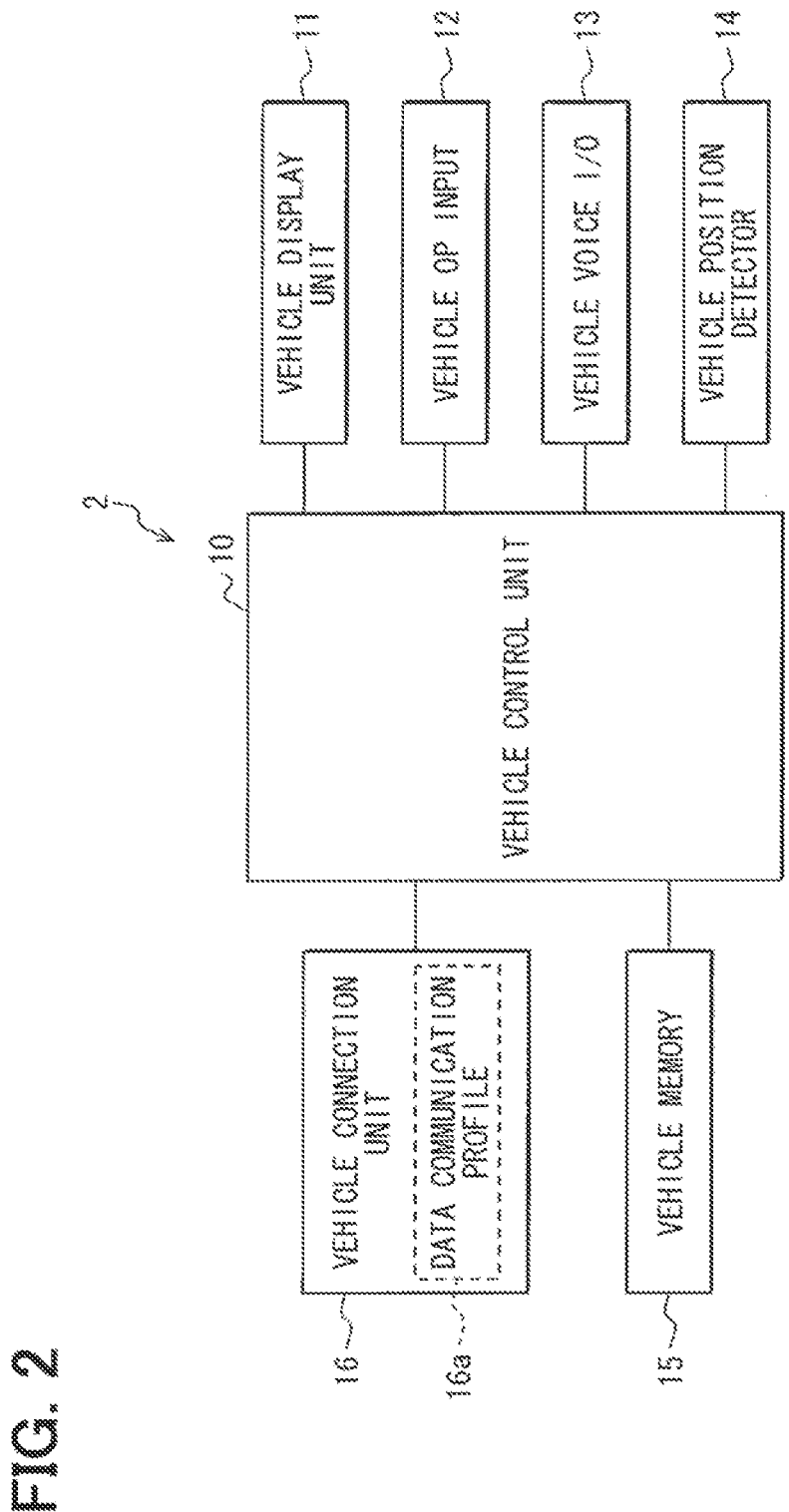
FIG. 2 is a block diagram of a vehicular device that serves as the mobile terminal.

With reference to FIG. 2, the vehicular device 2 has a vehicle control unit 10, a vehicle display unit 11, a vehicle operation input unit 12, a vehicle voice input-output unit 13, a vehicle position detector 14, a vehicle memory 15 and a vehicle connection unit 16.

The vehicle control unit 10 may be implemented as a microcomputer which includes a CPU, a ROM, a RAM and the like, and controls the vehicular device 2 as a whole according to a program stored in the ROM. Further, the vehicle control unit 10 is capable of executing an application that operates in a cooperative manner with the portable communication terminal 3, and is also capable of executing a navigation function that guides the vehicle to a destination. The vehicular device 2 of the present embodiment may be a navigation apparatus.

The vehicle display unit 11 may be, for example, a liquid crystal display unit, an organic electroluminescence display unit, or a plasma display unit that are capable of displaying color images. The vehicle display unit 11 displays, for example, an operation screen of the vehicular device 2 or a map screen at a time of using the navigation function. Further, the vehicle display unit 11 also displays tabs that are used to switch between different screens of registered facility information, each of which lists the information items of the registered facility information, which are to be described later.

The vehicle operation input unit 12 may be implemented as a touch panel on a screen of the vehicle display unit 11, a touch switch around the display unit 11 or the like. The user may input various operations from the vehicle operation input unit 12 for controlling the vehicular device 2. The touch panel may use any method for receiving user inputs, such as a pressure sensing method, an electromagnetic induction method, an electrostatic induction method, or the like. The vehicle operation input unit 12 may serve as an operation input unit in claims together with the vehicle display unit.

The vehicle voice input-output unit 13 has a speaker and a microphone. The vehicle voice input-output unit 13 may output, from the vehicular device 2, a musical piece and/or a guide sound stored in the vehicle memory 15. Further, a voice command/operation of the user for the vehicular device 2 is input from the vehicle voice input-output unit 13.

The vehicle position detector 14 may have a GPS unit and/or a gyro sensor to detect a position of the vehicular device 2, or more practically a position of the vehicle in which the vehicular device 2 is installed. The vehicle position detector 14 may serve as a subject device position sensing unit in claims. Since how the position of the vehicle/device is detected by the GPS unit or the like is well-known, detailed explanation of the position detection is omitted from the present disclosure.

Based on the position of the vehicle detected by the vehicle position detector 14, the vehicle control unit 10 performs a navigation process to guide the vehicle to the destination. In other words, a navigation apparatus is utilized as the vehicular device 2 in the present embodiment.

The vehicle memory 15 stores, together with other data, musical piece data, map data to be used by the navigation function, application programs to be executed by the vehicular device 2, and registered facility information such as facility bookmarks that are registered by the user of the vehicular device 2.

The vehicle connection unit 16 is used for communication between the vehicular device 2 and the portable communication terminal 3. Such communication is performed by a Bluetooth (a registered trademark) standard. The Bluetooth is abbreviated as BT hereinafter, and connection by the Bluetooth standard is designated as BT connection.

The vehicle connection unit 16 has a data communication profile 16a such as SPP (i.e., Serial Port Profile), DUN (i.e., Dial-Up Network profile) or the like, and is connected to the portable communication terminal 3 by using those profiles. The vehicle side connection unit 16 may serve as a communication unit in claims.

Figure 3:
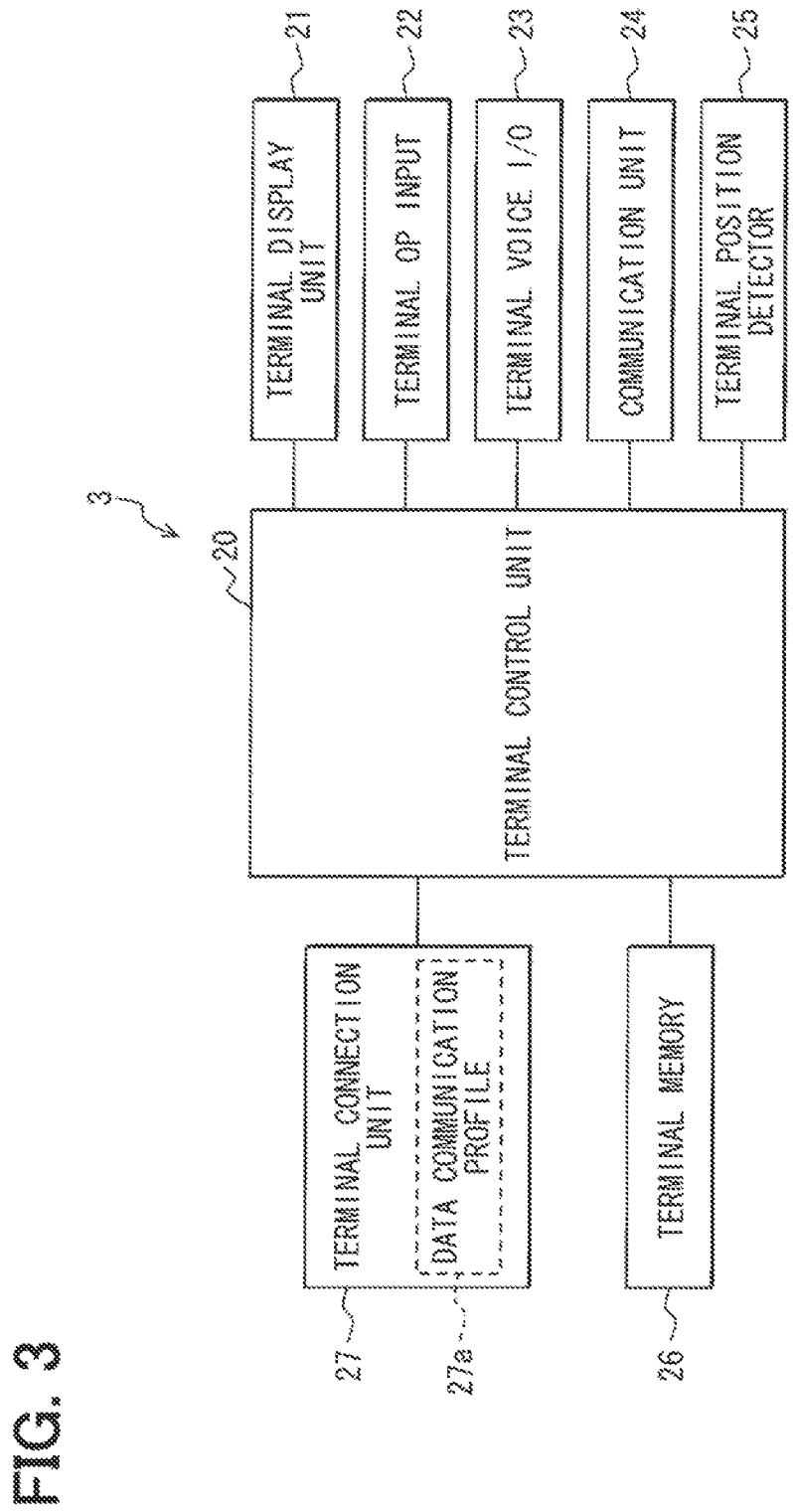
FIG. 3 is a block diagram of a portable communication terminal that serves as the mobile terminal.

With reference to FIG. 3, the portable communication terminal 3 as a mobile terminal has a terminal control unit 20, a terminal display unit 21, a terminal operation input unit 22, a terminal voice input-output unit 23, a communication unit 24, a terminal position detector 25, a terminal memory 26 and a terminal connection unit 27. In the present embodiment, the portable communication terminal 3 is assumed to be a smart phone type device.

The terminal control unit 20 is implemented as a microcomputer, including a CPU, a ROM, a RAM and the like, and controls the portable communication terminal 3 as a whole according to a program stored in the ROM, for example. Further, the terminal control unit 20 is capable of executing an application that operates in a cooperative manner with the vehicular device 2.

The terminal display unit 21 may be, for example, a liquid crystal display unit, or an organic electroluminescence display unit that is capable of displaying color images. The terminal display unit 21 may be used to display images and pictures stored in the vehicle memory 26 as well as telephone book data and the like. The terminal display unit 21 may further display screen switching tabs and the registered facility information together with other data. The terminal display unit 21 may serve as a display unit in claims.

The terminal operation input unit 22 may be implemented as a touch panel on a screen of the terminal display unit 21, a touch switch around the display unit 21 or the like. The user may input various operations from the terminal operation input unit 22 for controlling the portable communication terminal 3. The touch panel may use any method for receiving a touch input from the user, such as a pressure sensing method, an electromagnetic induction method, an electrostatic induction method, or the like. The terminal operation input unit 22 may serve as an operation input unit in claims together with the terminal side display unit 21.

The terminal voice input-output unit 23 has a speaker and a microphone, and is used to input a user's voice and to output a received voice, such as a caller's voice. The terminal voice input-output unit 23 may output a musical piece and/or a sound/voice memorized in the terminal memory 26.

The communication unit 24 performs a wide area communication through a public line network and the network 4. The communication unit 24 sends/receives data to and from the network 4. The communication unit 24 may serve as an external communication unit in claims.

The terminal position detector 25 has a GPS unit and/or a gyro sensor, and detects a position of the portable communication terminal 3. Since how the position of a subject vehicle/device is detected by the GPS unit or the like is well-known, detailed explanation of the position detection is omitted from the present disclosure. The terminal position detector 25 serves as a subject device position sensing unit in claims.

The terminal memory 26 stores telephone book data, musical pieces, and/or user data saved by the user, as well as various applications performed on by the terminal devices and the registered facility information that may be bookmark information registered by the user of the portable communication terminal 3, details of which will be described later.

The terminal connection unit 27 has, just like the vehicular device 2, a data communication profiles 27a such as SPP, DUN or the like in the present embodiment. The terminal connection unit 27 is connected to the vehicular device 2 by using such profiles. The terminal connection unit 27 may also have a hands-free call profile such as HFP or the like, beside the data communication profile.

The operations and effects of the above-described system configuration are described in the following. The portable communication terminal 3 may be designated as "SP" in the description of the flowchart. Further, since the registered facility information is displayed in the same manner by both of the vehicular device 2 and the portable communication terminal 3, the display of such information on the vehicular device 2 is used as a representative example.

Figure 4:
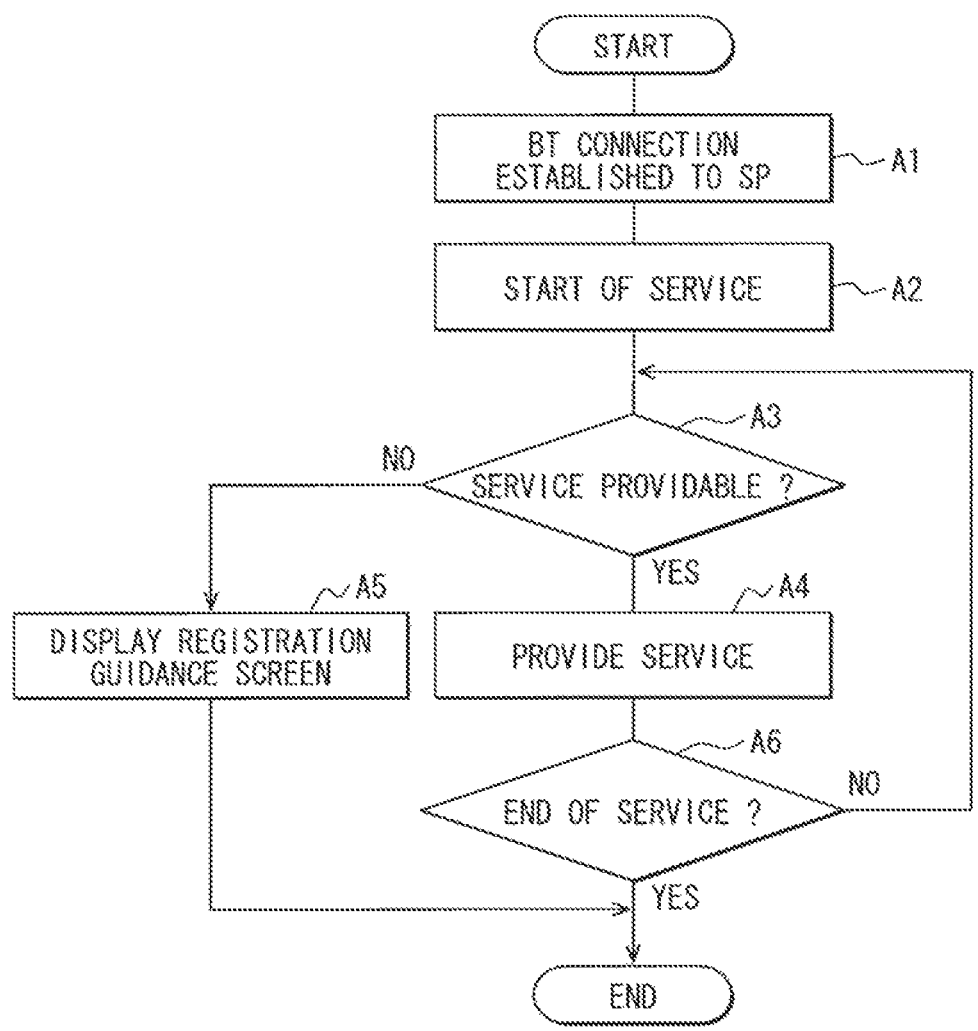
FIG. 4 is a flowchart of a control process performed by the mobile terminal.

With reference to FIG. 4, a control process performed by the vehicular device 2 is described. The process of FIG. 4 begins when the vehicular device 2 is turned on (i.e., when the ACC key is turned to an ON position). The vehicular device 2, at A1, establishes BT connection with the portable communication terminal 3. Subsequently, a service is started, at A2, for beginning a cooperative operation of the vehicular device 2 with the portable communication terminal 3 for the purpose of using a service (i.e., the contents) provided by the contents server 6 through the portable communication terminal 3.

Figure 5:
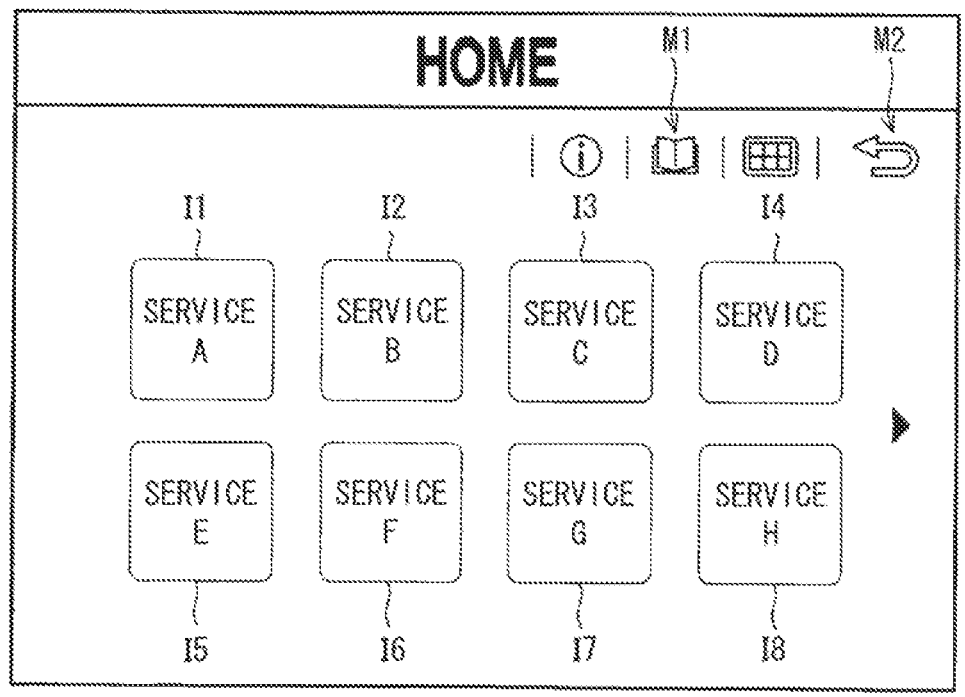
FIG. 5 is an illustration of a home screen of the vehicular device.

Accordingly, with reference to FIG. 5, the vehicular device 2 displays a home screen that includes icons I1 to I8 respectively corresponding to a service A to a service H on the vehicle display unit 11. The number of contents and/or the types of contents are not necessarily limited to the illustrated number/types.

The user chooses a desired service by, for example, touching one of the icons I1 to I8. The desired service may be a navigation function (FIG. 1). In FIG. 5, the service A is associated with the icon I1, the service B is associated with the icon I2, and the service C is associated with the icon I3. When one of the icons I1, I2, and I3 is operated, the associated application is executed by the vehicular device 2. In other words, vehicular device 2 can execute multiple applications.

In the home screen, a bookmark button M1 for displaying the registered facility information (i.e., information about the favorite facilities in the present embodiment) and en update button M2 for update/re-load the home screen are included. The update button M2 is also used for re-acquiring the registered facility information.

Figure 6:
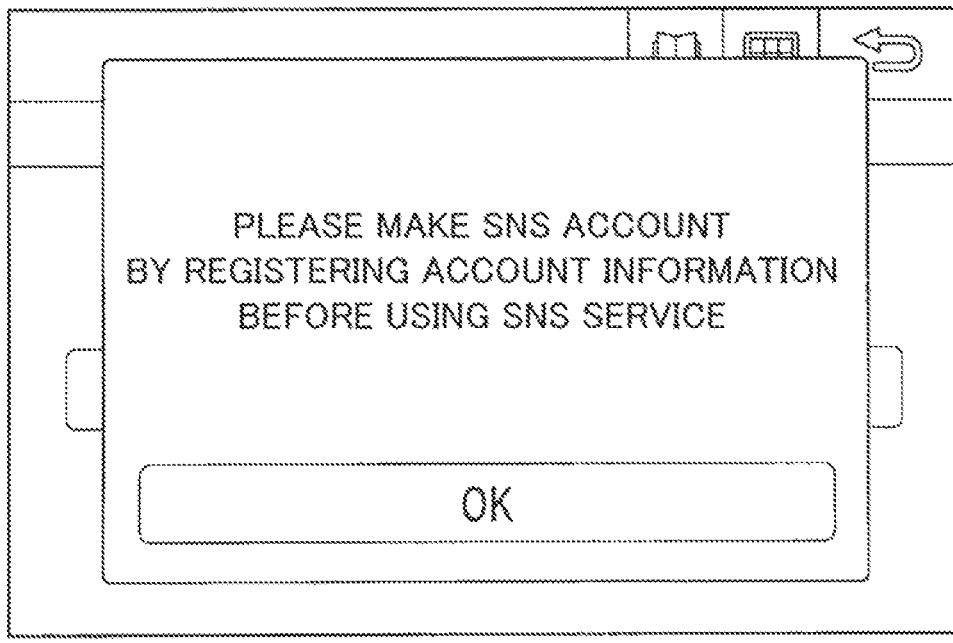
FIG. 6 is an illustration of a registration guidance screen of the vehicular device.

The vehicular device 2 determines whether the chosen service can be provided by the vehicular device 2 at A3. Specifically, it is determined whether a service receive setting has already been performed for receiving a service that is provided by the contents server 6. For example, prior to using a SNS service, a user account information haw to be input and registered to the SNS service, as an initial setting. If such in setting has not been performed (A3:NO), the vehicular device 2 displays an account registration guidance screen (FIG. 6) at A5.

If such initial setting has already been performed, the vehicular device 2 determines that the chosen service can be provided (A3:YES), and provides the service by acquiring the contents from the contents server 6 through the portable communication terminal 3 at A4. The vehicular device 2 continues the provision of the service until an end instruction for ending the provided service is provided by the user (A6). The vehicular device 2 puts an end to the process, once the user instructs an end to the service (A6:YES). In such manner, the vehicular device 2 provides a service that is chosen by the user.

With reference to FIGS. 7 to 11, an operation of the vehicular device 2 at a time of a user operation of the bookmark button M1 is described.

First, the description of the information displayed by the vehicular device 2 of the present embodiment is given.

The bookmark information, which includes the registered facility information selected by the user, may be stored by the database of the contents server 6 according to SNS services, or may be stored by the database that is used by the vehicular device 2.

The bookmark information registered on the contents server 6 may be divided into two categories: a first category includes information exclusively used by the user who registered such information, which may be referred to as an exclusive possession information; and a second category includes information registered and shared by many users including a specific user (e.g., sharer information among a first, a second, and a third user), which may be referred to as a shared information. The vehicular device 2 displays the information from the first and second categories in the following manner, which allows switching display of respective information categories.

When the user would like to display the bookmark information, the user operates the bookmark button M1 displayed on the home screen (FIG. 5). The bookmark button M1 is displayed with any contents display screen in the present embodiment. In other words, the bookmark button M1 is not only displayed on the home screen, but is also displayed on other screens having different contents, such as a local search screen, a check-in screen, and the like. Therefore, the user has access to the bookmark information at any time for displaying the bookmark information on the screen. Further, the user can register the bookmark information from any screen.

Figure 7:
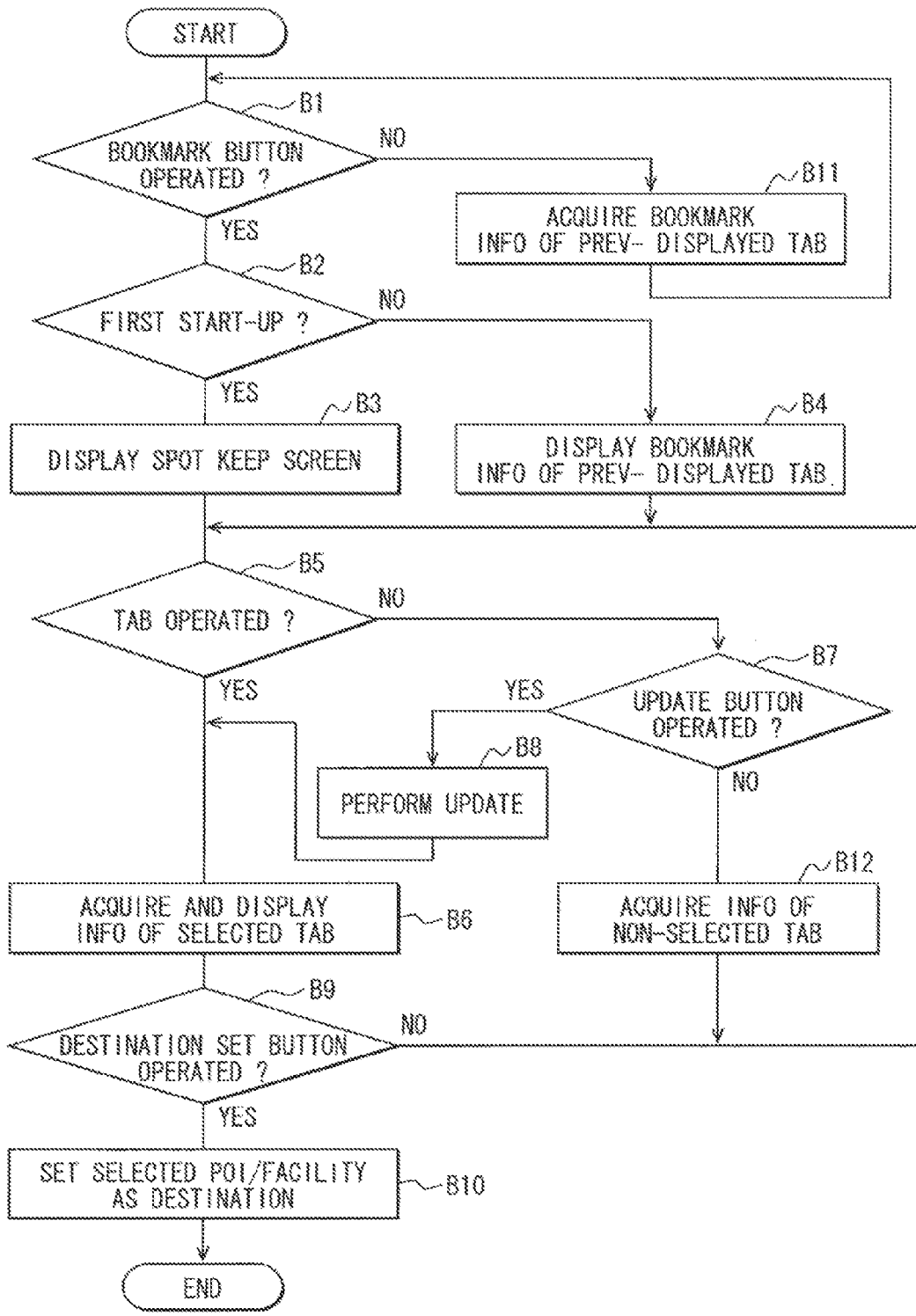
FIG. 7 is a flowchart of an information display process performed by the mobile terminal.

With reference to FIG. 7, the vehicular device 2 performs the information display process. The vehicular device 2 determines whether the bookmark button M1 is operated at B1. If it is operated (B1:YES), then the vehicular device 2 determines whether it is a first start-up (B2). The first start-up is the operation of the bookmark button M1 for the first time after the registration of the account information.

Figure 8:
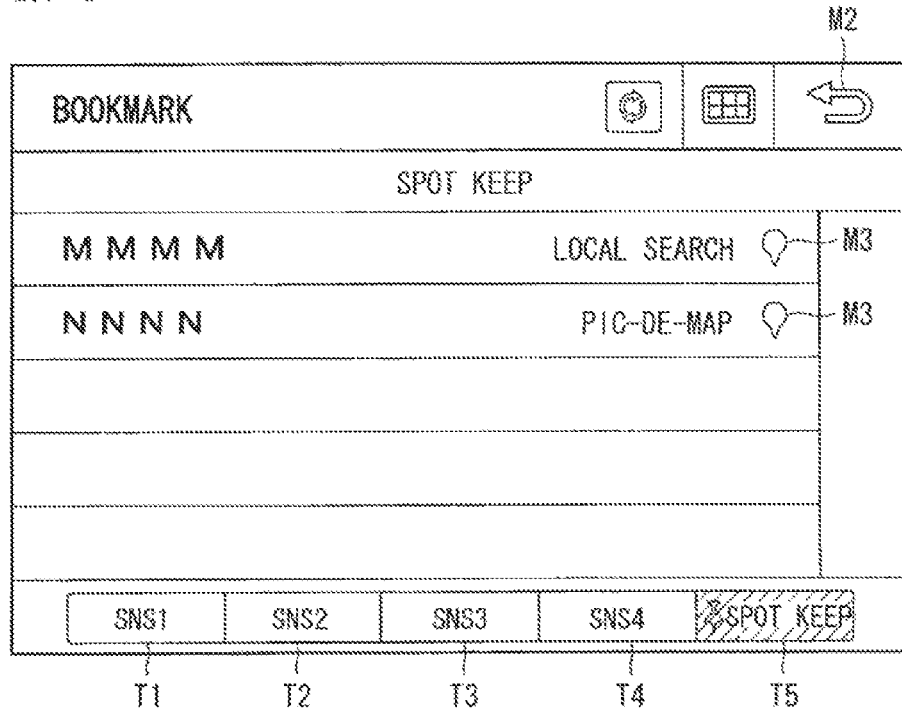
FIG. 8 is an illustration of an exclusive possession information display screen in the vehicular device.

With reference to FIG. 8, after determining the first start-up (B2:YES), the vehicular device 2 displays a spot keep screen at B3. The spot keep is the registration of information about a spot or a facility during the use of the service provided by the vehicular device 2. The information registered by using the spot keep screen is stored in the vehicle memory 15, and is exclusively used by the user as the exclusive possession information.

As way of example, the spot keep screen of FIG. 8 displays, as a list, an information item "MMMM" that was registered at a time of using a local search service and an information item "NNNN" that was registered at a time of using a "pic-de-map" service (i.e., exclusive possession information). In this case, the vehicular device 2 displays tabs T1 to T5 which respectively have information that identifies the source of each bookmark. In the present embodiment, the source is identified by the database name, which for instance, is shown as the name of each of the SNSs, since the provided services are all SNS kinds.

Tabs T1 to T4 respectively show the names of SNS1 to SNS4 from which the bookmark information is acquired. Tabs T1 to T4 may be provided as a second tab in claims. Further, in tab T5, a "spot keep" function, which is the registered facility information stored by the mobile terminal (i.e., the vehicle device 2), is set as the source of acquired information. The tab T5 maybe referred to as a first tab in claims. In addition, registered facility information stored and managed in the database of the mobile terminal (e.g., vehicle device 2 and portable communication terminal 3) may be referred to as a first registered facility information and registered facility information stored and managed in the database of the external server 6 may be referred to as a second registered facility information may in the claims.

The hatching of the tab 15 in FIG. 8 indicates that the currently displayed information is acquired from the source (i.e., the database) "spot keep." In other words, the vehicular device 2 uses tabs T1 to T5 arranged in a row on the screen with hatching added to one of them, for displaying the source information (i.e., the source of the acquired information) in which the display status of the registered facility information is shown in a distinguishable manner, such that the registered facility information that is currently being displayed on the vehicle side display unit 11 is shown differently from the registered facility information that are not being displayed.

Further, the update button M2 for updating the information and the destination setting buttons M3 corresponding to each of the listed bookmark information are also displayed.

With continuing reference to FIG. 7, after the display of the spot keep screen (B3), the vehicular device 2 determines whether any of the tabs displayed on the vehicle display 11 have been operated (i.e., touched). If as tab is operated, the vehicular device 2 acquired and displays information of the selected tab at B6.

Figure 9:
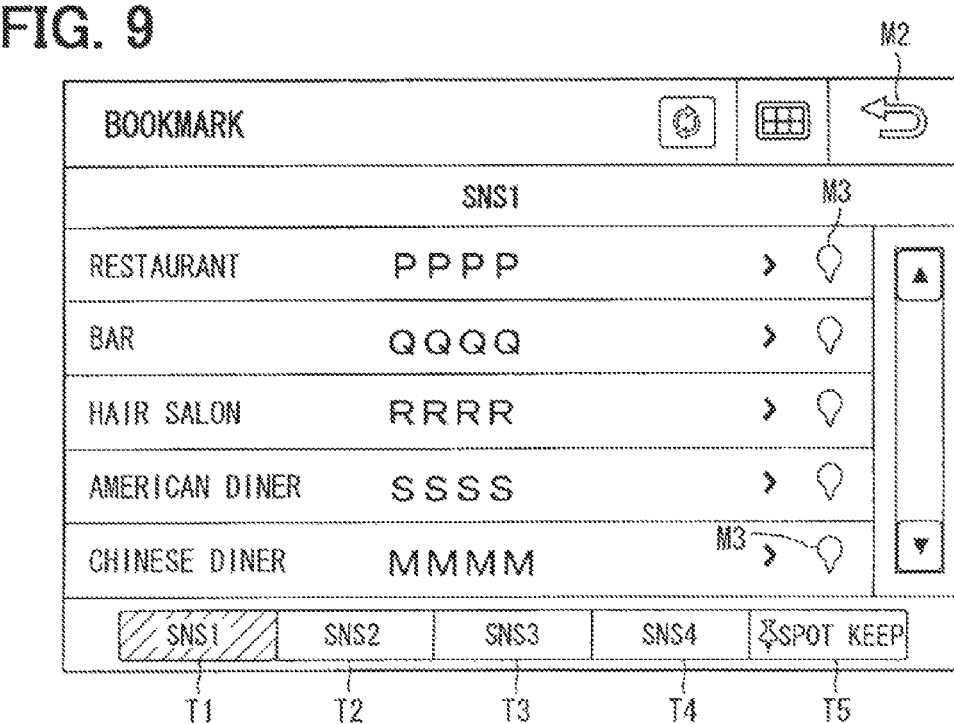
FIG. 9 is an illustration of an exclusive possession information display screen in the vehicular device.

For instance, with reference to FIG. 9, when one of the tabs T1 to T4 is operated by the user, such as tab T1, for switching the screen, the vehicular device 2 displays the bookmark information acquired from SNS1 that corresponds to the tab T1 due to the tab switching operation. In the example of FIG. 9, the bookmark information acquired from SNS1 is listed. In the present embodiment, SNS1 stores the bookmark information that is used exclusively by a certain user. In other words, the information shown in FIG. 9 is used by a user as exclusive possession information that is stored by the contents server 6 of the network 4 as the first category.

Figure 10:
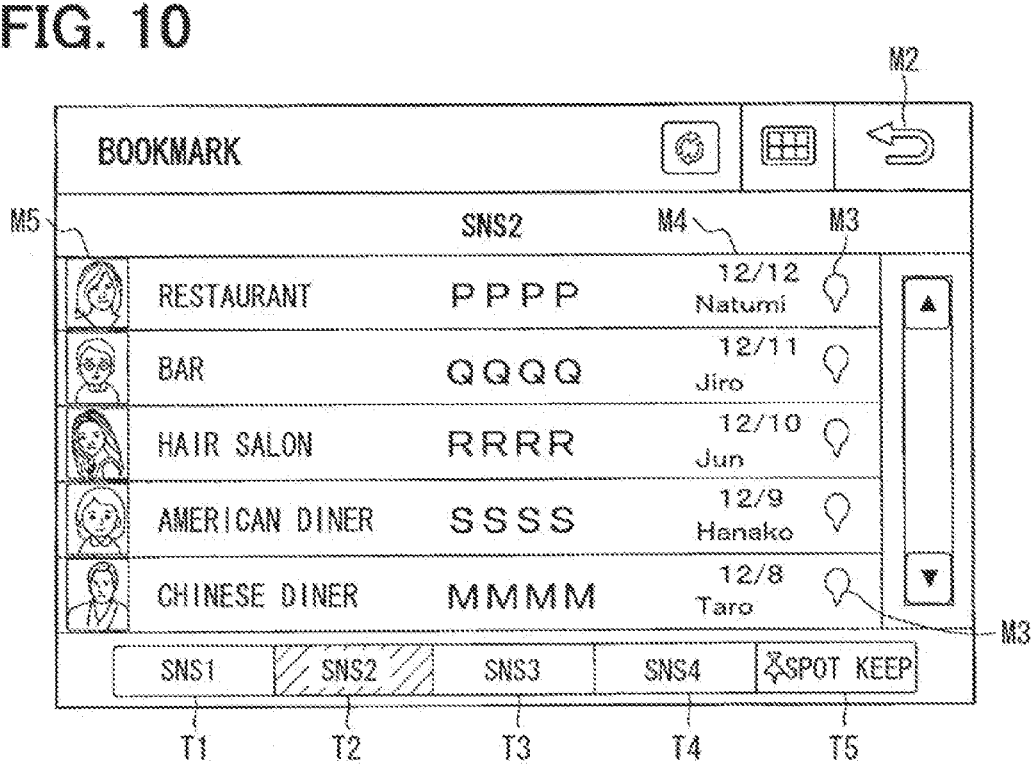
FIG. 10 is an illustration of a shared information display screen in the vehicular device.
Figure 11:
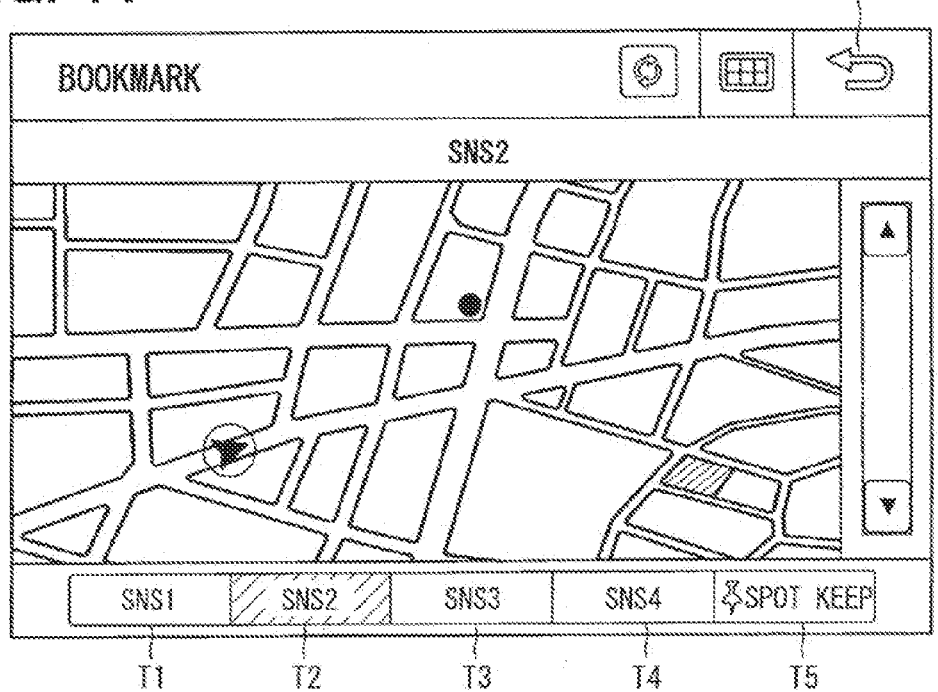
FIG. 11 is an illustration of a guidance screen in the vehicular device having a destination already set therein.

In another example, with reference to FIG. 10, if the tab T2 is operated in order to display the bookmark information that is acquired from SNS2, a list of acquired bookmark information from SNS2 displayed. In the present embodiment, SNS2 stories the bookmark information that can be registered and shared by multiple/many users. The information of FIG. 10 is equivalent to the shared information stored on the contents server 6 portion of the network 4 as the second category.

Each of the information items has a name column M4 and a picture column M5 for showing the name/picture of the uploader of the information item. Thus, the viewer can identify who registered/uploaded the bookmark information. In this case, the sharing of the bookmark information in SNS2 may be allowed only among a certain group of people or may be allowed for (i.e., viewed by) general public.

As described above, the vehicular device 2 can switchably display the bookmark information managed by multiple databases. For instance, the bookmark information managed by the database of the contents server 6 or the bookmark information managed by the database of the vehicular device 2 may be displayed. Therefore, viewing of the bookmark information by the user is standardized in a common format for both of the bookmark information, i.e., information from the network and information from the mobile terminal (e.g., the vehicle device). The once-viewed contents of the bookmark information may be "cached" by the vehicular device 2 for later use, that is, for a quick re-display of the once-viewed contents.

Further, the bookmark information, e.g., the information from SNS2, may be updated by the third person because it is shared by many users. Therefore, each screen of the vehicular device 2 has the update button M2 displayed thereon. At B7 of FIG. 7, when the update button M2 is operated by the user, such as through a touch operation, (B7:YES), the bookmark information is updated (B8), and then displayed (B6). In such manner, the latest bookmark information is displayed. Further, though not illustrated, in case of having the end operation performed by the user during a use input wait time (B5:NO, B7:NO, B9:NO), or, in case, of having a start-up operation for starting the other application program, the information display process is concluded.

When the user would like to not only view the bookmark information but also utilize the bookmark information, the user may use the destination setting button M3 arranged beside the information item on the list as shown in FIG. 10. That is, the vehicular device 2 allows the user to acquire the facility information that is associated with the information item on the list by displaying the button M3, when the listed information item has such facility information. The facility information may include, as the location information of the facility, the longitude/latitude, the street address, the postal code, the telephone number or the number/alphabet roughly specifying a location on a map.

The vehicular device 2 determines whether the destination setting button M3 is operated by the user at B9. If the destination setting button is operated (B9:YES), the vehicular device 2 sets, as a destination, a chosen location (B10). For instance, based on the facility information (i.e., the longitude/latitude, telephone number, etc.), the vehicular device 2 looks up a map database of the navigation function to set the destination. The vehicular device 2 then displays a map screen as shown in FIG. 13 for guiding the vehicle to the destination. Further the vehicular device 2 may relay the facility information to the navigation function for the display of a normal navigation screen, or may transfer the entire processing to the navigation function.

In such manner, the vehicular device 2 not only enables the viewing of the bookmark information but also allows the user to utilize the bookmark information.

As described above, the bookmark button M1 is displayed on the screen when each of the contents is utilized. In other words, the bookmark button M1 is always available to the user. Therefore, in the present embodiment, the vehicular device 2 is configured to execute the information display process (FIG. 7) as a background process when, for example, the vehicle device 2 is started. Even when the bookmark button M1 is not operated (B1:NO), the vehicular device 2 acquires (i.e., pre-fetches) the bookmark information in a tab which was previously displayed (B11). In such manner, the information of the bookmark can be displayed as soon as the bookmark button M1 is operated by the user. Further, the acquisition of the bookmark information in B11 is performed only once at a time of start-up of the vehicular device 2, thereby preventing (i) unnecessary communication with the server and (ii) interference with the operation of other contents/application.

The vehicular device 2 may also acquire (i.e., pre-fetches) the bookmark information when the bookmark button M1 is operated. That is the bookmark information of the information items under "non-displayed" tabs T1 to T5 is pre-fetched before switching to one of those tabs T1 to T5 by the touch operation on the tabs T1 to T5. Specifically, when the application is started and the previously-displayed registered facility information (e.g., the bookmark information under the tab T1) is being displayed, the bookmark information corresponding to the tabs T2 to T5 is acquired in the background. In such case, the bookmark information corresponding to all the tabs T2 to T5 may be acquired.

Since the shared information may be updated by a third party in real time, the shared information may preferably be configured to be updated when the switch operation for switching the tabs is performed, instead of pre-fetching the bookmark information. The switch operation indicates that the user would like to view the latest information. Also, since the exclusive possession information may not be updated by the third party, the exclusive possession information may preferably be pre-fetched in the background, for decreasing the download/wait time for viewing the information.

In addition, a prioritized information acquisition scheme may also be devised. That is, the first registered facility information stored on the mobile terminal side may be primarily acquired in a prioritized manner (for information viewing), and then, the second registered facility information that needs to be acquired through communication may be acquired thereafter or at a time of performing the switching operation by the user.

According to the present embodiment described above, the advantageous effects in the following may be achieved.

The mobile terminal, which may be provided as the vehicle device 2 and/or the portable communication terminal 3, displays, on a display unit, such as the vehicle display unit 11 and/or the terminal display unit 21, a list of the registered facility information managed by the database in the memory unit (i.e., the vehicle memory 15, the terminal memory 26) of the mobile terminal or a list of the registered facility information managed by the database of the external contents server 6, in a common display format. In other words, the mobile terminal uses a common display format for listing the registered facility information from respectively different databases. Therefore, the user convenience is improved.

The mobile terminal uses a list form as the display arrangement of the registered facility information from each of the different databases, one list of information associated with one database, for the display of the information items of the bookmark information. Further, the source information, identifying the source (i.e., the database) of the bookmark information currently-displayed and other information having been acquired, is displayed in a row on the screen in a distinguishable manner as named tabs, such as SNS1, SNS2, Spot keep.

The look or form of each tab explicitly indicates that the contents of which one of many tabs are currently being displayed on the screen and the contents of which tab are not currently being displayed. In such manner, the display unit displays the bookmark information from different databases in a common format, allowing the user to perform a common switching operation for switching between the tabs, due to the "single row" arrangement of the tabs. In other words, not only the display format for displaying the information from different databases but also the operation format for the tab switching operation are made in common for the display of the bookmark information from each of the different databases. Therefore, the user convenience is further improved.

Further, since the mobile terminal can acquire in advance, or can pre-fetch, a non-displayed bookmark information before the input of the switching operation (i.e., before the touch operation on the bookmark button M1), the bookmark information desired is readily displayed on the screen when the bookmark button M1 is operated, which also improves the user convenience.

The mobile terminal displays both of the shared information and the exclusive possession information as the bookmark information. The shared information is registered and shared by multiple users and the exclusive possession information is exclusively registered and used by the owner of the mobile terminal. Further, the mobile terminal uses a common display format for displaying both of the registered facility information from the server side database (e.g., the database on the contents server 6 of an SNS service) and the registered facility information from the mobile terminal side database. Therefore, the possibility of the user's confusion is further decreased.

The mobile terminal acquires the exclusive possession information in a prioritized manner. The mobile terminal acquires the information that may most-likely be utilized by the user in advance. In such manner, the user's convenience may further be improved. Further, since the information display process is executed in the background at a time of start-up, the bookmark information is readily displayed upon the operation of the bookmark button M1. Further, since the acquisition of the bookmark information is performed only once at a time of start-up of the mobile terminal, unnecessary communication to the server is prevented and interference with the operation of the other application is prevented.

The mobile terminal displays the destination setting button M3 for each of the bookmark information items which has associated therewith the facility information for identifying the registered facility, and allows the user to use such button M3 for setting, as the destination, the facility associated with the chosen information item. In such manner, the user is enabled not only to view the bookmark information but also to utilize the bookmark information.

Other Embodiments

Although the present disclosure has been fully described in connection with the preferred embodiment thereof with reference to the accompanying drawings, it is to be noted that various changes and modifications will become apparent to those skilled in the art.

For instance, the number and the size of tabs in the above embodiment may be changed. In other words, the tabs may be vertically arranged, or the tabs may be horizontally arranged in an upper part of the screen.

The bookmark information may include other information, which is registered by the other applications. For instance, frequently-used information such as a telephone number, a facility name to be utilized in the navigation function may be included in the bookmark information. In such case, the mobile terminal may have another tab shown on the screen, beside the tabs in FIG. 10, with the name "External App," indicating the source of such information, in the same manner as the tabs representing the shared information and the exclusive possession information.

Such changes and modifications are to be understood as being within the scope of the present disclosure as defined by the appended claims.

What is claimed is:

1. A mobile terminal comprising:
a memory having a database for storing and managing registered bookmark information for a user registered destination, the registered bookmark information managed by the memory being provided as a first registered bookmark information;
a display displaying, in a common format, a first list for the first registered bookmark information managed by the memory and a second list for a second registered bookmark information being registered bookmark information managed by a database in an external server;
an input controller receiving an input regarding a switch operation for switching between the first list of the first registered bookmark information and the second list of the second registered bookmark information for displaying information on the display; and
a controller controlling the display by switching the display of the registered bookmark information on the display according to the input of the switch operation, wherein
the registered bookmark information managed by the database of the external server includes a shared information and an exclusive possession information, wherein
the shared information is registered bookmark information registered and shared by multiple users,
the exclusive possession information is registered bookmark information registered and exclusively used by a single user,
the exclusive possession information is acquired from the database of the external server before the switch operation is performed for displaying the exclusive possession information, and
the shared information is acquired from the database of the external server when the switch operation is performed for displaying the shared information.

2. The mobile terminal of claim 1, wherein
the controller acquires, from at least one of the database of the memory and the database of the external server, non-displayed registered bookmark information that is not currently being displayed on the display unit before the switch operation is provided by the input controller.

3. The mobile terminal of claim 1, wherein
the display displays a first tab associated with the display of the first list and a second tab associated with the display of the second list, and
the first tab and the second tab respectively indicate whether the first list or second list is currently being displayed.

4. The mobile terminal of claim 1, wherein
the memory stores source information that identifies the database that serves as a source of the registered bookmark information that is displayed on the display, and
the display acquires, from the database that is identified by the source information, the registered bookmark information at a next displaying time of the registered bookmark information.

5. The mobile terminal of claim 1, wherein
the controller executes multiple applications that are respectively allowed to register the registered bookmark information to be managed by the database in the memory unit, and
the display displays the registered bookmark information in a common display format regardless of which one of the multiple applications is used to register the registered bookmark information.

6. The mobile terminal of claim 1 further comprising:
a position sensor detecting a position of mobile terminal, wherein
the registered bookmark information includes destination information that is capable of identifying one of a registered destination and a registered location, and
the controller performs a navigation function that provides a guide to a destination, and
the controller sets as the destination the destination that corresponds to an information item of the registered bookmark information that has the bookmark information associated therewith when the user has chosen such registered bookmark information.

7. The mobile terminal of claim 1, wherein
the registered bookmark information includes, as location information of the destination, at least one of longitude/latitude location, street address, postal code, or telephone number.

8. The mobile terminal of claim 1, wherein the viewing of the first list for the first registered bookmark information and the second list for the second registered bookmark information are standardized in the common format.

9. The mobile terminal of claim 1, wherein the bookmark information comprises a registered facility information selected by a user as a user's favorite information.

10. A portable communication terminal comprising:
a memory having a database for storing and managing registered bookmark information for a user registered destination, the registered bookmark information managed by the memory being provided as a first registered bookmark information;
an external communicator acquiring a second registered bookmark information from an external server, the second registered bookmark information being registered bookmark information managed by a database in the external server;
a display displaying, in a common format, a first list for the first registered bookmark information managed by the memory unit and a second list for the second registered bookmark information;
an input controller receiving an input regarding a switch operation for switching between the first list of the first registered bookmark information and the second list of the second registered bookmark information for displaying information on the display; and a controller controlling the display by switching the display of the registered bookmark information on the display according to the input of the switch operation, wherein the registered bookmark information managed by the database of the external server includes a shared information and an exclusive possession information, wherein the shared information is registered bookmark information registered and shared by multiple users, the exclusive possession information is registered bookmark information registered and exclusively used by a single user, the exclusive possession information is acquired from the database of the external server before the switch operation is performed for displaying the exclusive possession information, and the shared information is acquired from the database of the external server when the switch operation is performed for displaying the shared information.

* * * * *